US012798344B2

(12) United States Patent
Lee et al.

(10) Patent No.: US 12,798,344 B2
(45) Date of Patent: Nov. 17, 2026

(54) FOLDABLE LOADING BOX COVER ASSEMBLY FOR A VEHICLE

(71) Applicants: HYUNDAI MOTOR COMPANY, Seoul (KR); KIA CORPORATION, Seoul (KR)

(72) Inventors: Jae-Seung Lee, Hwaseong-si (KR); Hyung-Sik Choi, Seoul (KR); Gook-Hyun Jeon, Seoul (KR); Woo-Sik Yoon, Incheon (KR); Min-Su Kim, Seoul (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 170 days.

(21) Appl. No.: 18/955,273

(22) Filed: Nov. 21, 2024

(65) Prior Publication Data

US 2025/0187411 A1 Jun. 12, 2025

(30) Foreign Application Priority Data

Dec. 7, 2023 (KR) ........................ 10-2023-0176726

(51) Int. Cl.
*B60J 7/14* (2006.01)
*B60J 7/04* (2006.01)
*B60J 7/057* (2006.01)

(52) U.S. Cl.
CPC ............... *B60J 7/141* (2013.01); *B60J 7/041* (2013.01); *B60J 7/0573* (2013.01)

(58) Field of Classification Search
CPC ... B60J 7/041; B60J 7/042; B60J 7/141; B60J 7/148
See application file for complete search history.

(56) References Cited

U.S. PATENT DOCUMENTS 11,440,386 B2 * 9/2022 Fowler ..................... B60J 7/141
12,403,752 B2 * 9/2025 Hammoud ............... B60J 7/141
12,565,088 B2 * 3/2026 Dylewski, II ............ B60J 7/106

FOREIGN PATENT DOCUMENTS

KR 20210027558 A 3/2021

* cited by examiner

*Primary Examiner* — Nicholas McFall
(74) *Attorney, Agent, or Firm* — Lempia Summerfield Katz LLC

(57) ABSTRACT

A foldable loading box cover assembly for a vehicle has an articulated rail and includes a cover unit. The cover unit includes a plurality of slats where each slat has an upper end and a lower end alternately connected to adjacent slats when folded. The cover unit is folded or unfolded to uncover or cover a loading box of a vehicle. The cover assembly includes a main rail installed at an upper end of the loading box, disposed in a reward direction of the vehicle, and configured to guide the lower ends of the plurality of slats. The cover assembly includes an articulated rail installed on the main rail and configured to guide the upper ends of the plurality of slats. When the cover unit is folded, the articulated rail is separated from the main rail to guide the upper ends of the plurality of slats.

20 Claims, 18 Drawing Sheets

FOLDABLE LOADING BOX COVER ASSEMBLY FOR A VEHICLE

CROSS-REFERENCE TO RELATED APPLICATION

This application claims priority to Korean Patent Application No. 10-2023-0176726, filed on Dec. 7, 2023, which is incorporated herein by reference in its entirety.

BACKGROUND

Field of the Disclosure

The present disclosure relates to a loading box cover for covering a loading box of a vehicle, and more specifically, to a foldable loading box cover assembly having an articulated rail.

Description of Related Art

In a vehicle 100 such as a pickup truck as shown in FIG. 1, a loading bay, load bay, load box, or loading box 110 with a predetermined size is formed at the rear portion of the vehicle 100.

The loading box 110 is provided with a cover to protect cargo loaded in the loading box 110. The cover is provided as a roll shutter 130 to reduce a volume when stored. When the roll shutter 130 is unfolded or unrolled, an upper portion of the loading box 110 may be closed to prevent foreign substances such as dust from being introduced into the loading box 110 or to prevent the cargo from being ejected from the loading box 110.

However, for the roll shutter 130, a case 140 is installed inside the loading box 110 so that the roll shutter 130 may be accommodated therein when rolled up (see portion A of FIG. 2). There is a problem in that an internal storage space of the loading box 110 is reduced due to the size and location of the case 140, thereby reducing an available loading space.

In addition, as a height h between a lower surface of the loading box 110 and the case 140 is less than a portion where the case 140 is not installed, there is a problem in that the utilization of a mid-gate 120 provided between a passenger compartment of the vehicle and the loading box 110 is reduced. In other words, by opening the mid-gate 120 so that a portion of a lengthy cargo is stored in a second row of seats of the passenger compartment, and as the case 140 protrudes, even when the mid-gate 120 is opened, there is a problem in that the case 140 hides a portion of the open space from view.

SUMMARY

The present disclosure has been derived to solve the above problems. The present disclosure is directed to providing a folding type loading box cover assembly having an articulated rail for a vehicle. The articulated rail constitutes a portion of a rail for supporting and guiding a plurality of slats for covering an upper portion of a loading box.

In order to achieve these and other unmentioned objects, a folding type loading box cover assembly having an articulated rail for a vehicle according to the present disclosure is provided. The assembly may include a cover unit, which includes a plurality of slats, in which each slat of the plurality of slats has an upper end and a lower end alternately connected to another adjacent slat. The cover unit is folded or unfolded to uncover or cover a loading box of the vehicle. The assembly may also include a main rail installed at an upper end of the loading box of the vehicle, extending in a rearward direction of the vehicle, and configured to guide the lower ends of the plurality of slats. The assembly may also include an articulated rail installed on the main rail and configured to guide the upper ends of the plurality of slats. When the cover unit is folded, the articulated rail may be separated from the main rail to guide the upper end of the plurality of slats folded.

The articulated rail may include a first rail member configured to maintain a linear shape when the articulated rail is separated from the main rail and may include a second rail member configured to bend or have a curved shape when the articulated rail is separated from the main rail.

The first rail member may include a first body, a first upper guide extending laterally inward from an upper end of the first body toward an inside of the vehicle by a predetermined length, and a first lower guide extending laterally inward from a lower end of the first body toward the inside of the vehicle by a predetermined length. The first rail member may also include a first connection hole hinge-connected to another first rail member disposed to overlap the first rail member or the second rail member. The first rail member may further include a first connection hook fitted into another first rail member disposed to overlap the first rail member or the second rail member and may include a fastening hole into which the first connection hook or a second connection hook formed on the second rail member is fitted.

An end portion of the first upper guide may extend laterally to be located inward beyond an end portion of the first lower guide.

An upper bracket may connect the upper ends of two adjacent slats and an upper slider may be rotatably installed on the upper bracket and configured to slide between the first upper guide and the first lower guide when the cover unit is folded.

The second rail member may include a second body, a second upper guide extending laterally inward from an upper end of the second body toward an inside of the vehicle by a predetermined length, and a second lower guide extending laterally inward from a lower end of the second body toward the inside of the vehicle by a predetermined length. The second rail member may also include a second connection hole hinge-connected to another second rail member disposed to overlap the second rail member or the first rail member. The second rail member may further include a second connection hook fitted into another second rail member disposed to overlap the second rail member or the first rail member and may include a slit into which the second connection hook or a first connection hook formed on the first rail member is fitted.

The slit may be formed in an arc shape and may be configured to permit rotation of two second rail members disposed to overlap each other at predetermined angles.

A center line of the slit may be a portion of a virtual circle around the second connection hole.

An end portion of the second upper guide may extend laterally inward to be located further inward beyond an end portion of the second lower guide.

A lower bracket may connect the lower ends of the two adjacent slats of the plurality of slats may be provided and a lower slider may be rotatably installed on the lower bracket and configured to slide on the main rail when the cover unit is folded.

The folding type loading box cover assembly having an articulated rail for a vehicle may further include a return spring configured to elastically support the articulated rail to be in contact with the main rail.

The return spring may have a first end fixed to a rail member installed closest to a rear end of the vehicle and a second end fixed to one side of the main rail and elastically supported toward the rear of the vehicle and of the articulated rail.

The folding type loading box cover assembly having an articulated rail for a vehicle rail may further include a connector disposed between two adjacent slats of the plurality of slats and each hinge-connected to the connector.

A weather strip may be provided between each slat of the plurality of slats and each connector.

The folding type loading box cover assembly having an articulated rail for a vehicle may further include a driving motor, a driving gear configured to be rotated by the driving motor, and a cable engaged with the driving gear. The cable may be configured to selectively push and pull an end portion of the cover unit according to rotation of the driving gear. A rearmost slat of the plurality of slats of the cover unit positioned to be maximally spaced apart from the driving motor may be pushed to unfold the cover unit or pulled to fold the cover unit.

The cable may have a spiral formed on an outer circumferential surface thereof or teeth formed in a longitudinal direction on the cable to be engaged with the driving gear.

A pair of cables may be provided and connected to both ends of at least the rearmost slat of the plurality of slats of the cover unit positioned to be maximally spaced apart from the driving motor.

The folding type loading box cover assembly having an articulated rail for a vehicle may further include a housing in which the driving motor and the driving gear are installed. The housing may be fixed to the front end of the main rail and a cable groove in which the cable is installed may be formed in the housing.

According to the folding type loading box cover assembly having an articulated rail for a vehicle of the present disclosure, the articulated rail may provide an operation path of the plurality of slats in conjunction with a folding operation of the plurality of slats when the upper portion of the loading box is opened.

In addition, since the upper portion of the loading box is a plane when the plurality of slats closes the upper portion of the loading box, the portion of the assembly protruding from the upper portion of the loading box when the loading box is closed may disappear to enhance an exterior appearance of the vehicle.

DESCRIPTION OF SPECIFIC EMBODIMENTS

Figure 1:
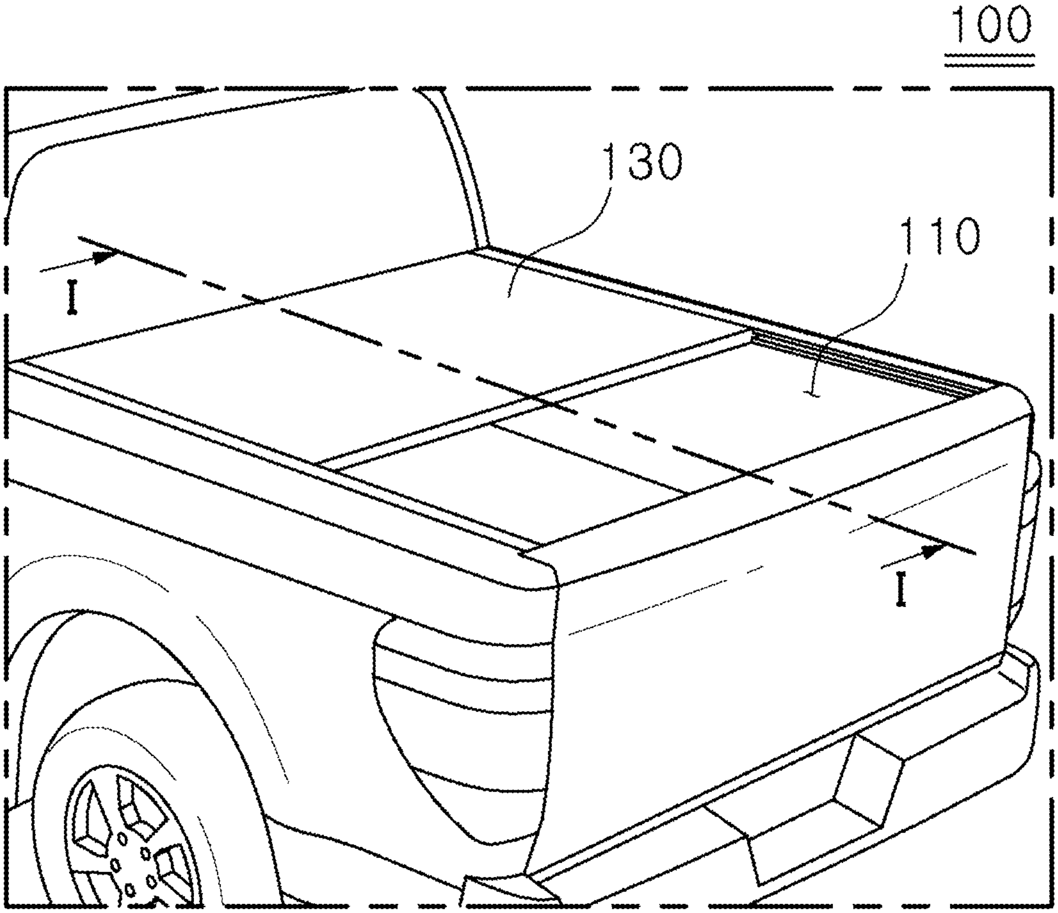
FIG. 1 (PRIOR ART)
FIG. 1 is a perspective view illustrating a state in which a cover is partially open in a loading box of a vehicle according to the related art.
Figure 2:
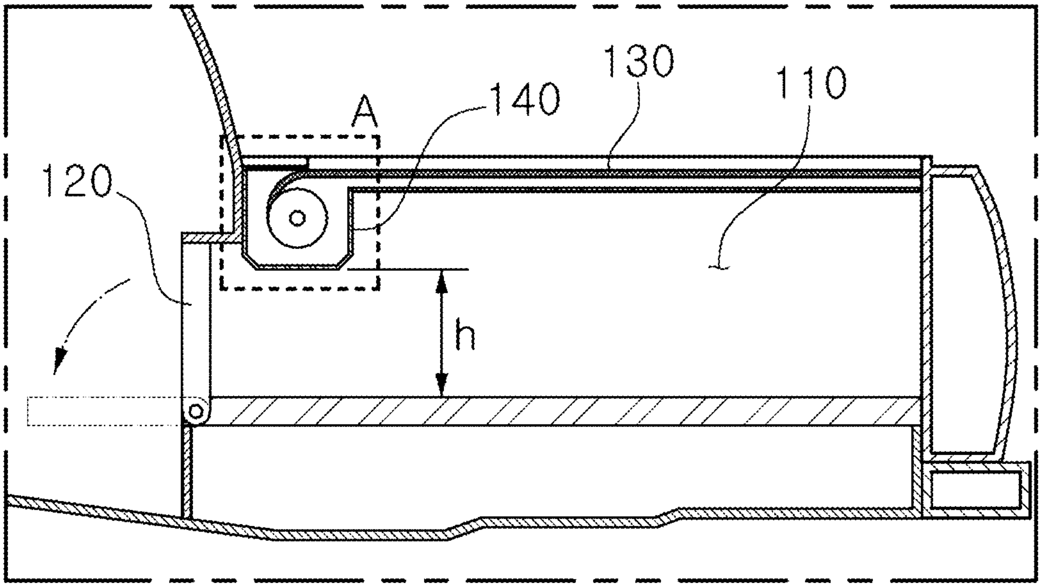
FIG. 2 (PRIOR ART)
FIG. 2 is a cross-sectional view taken along line I-I of the vehicle of FIG. 1.
Figure 3:
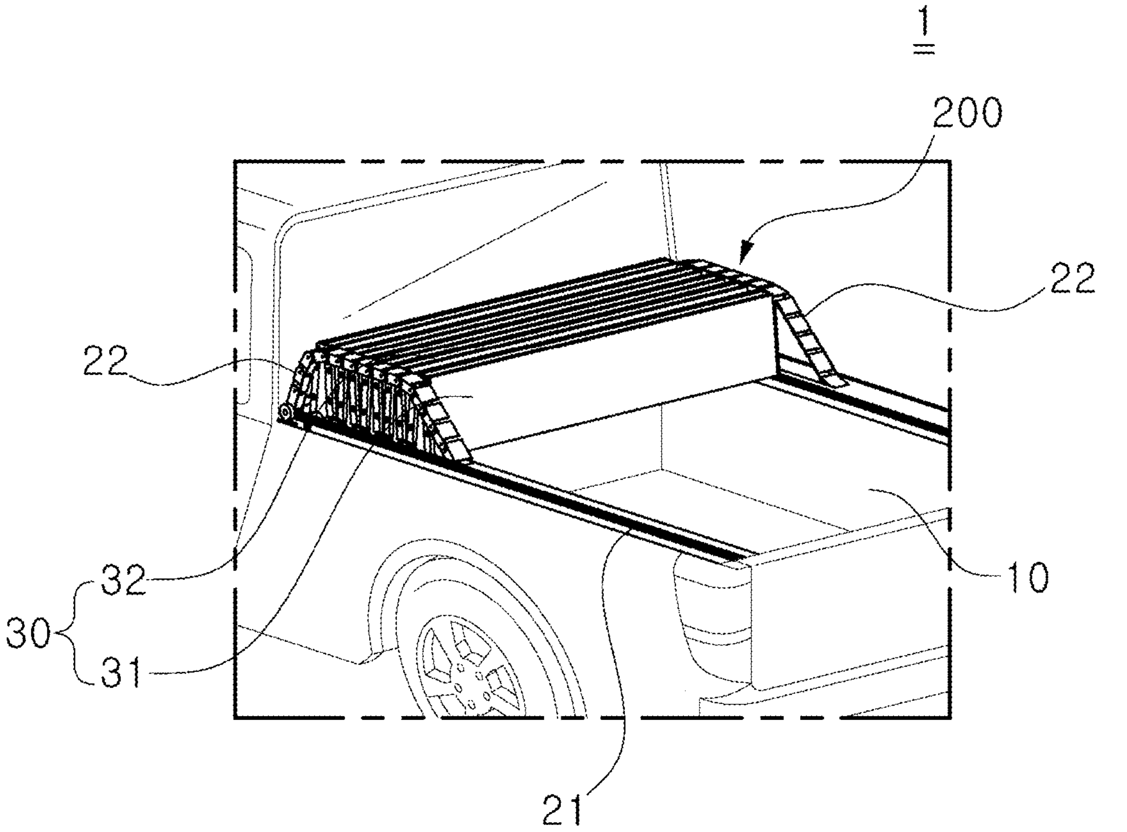
FIG. 3 is a perspective view illustrating a state in which a folding type loading box cover assembly having an articulated rail according to the present disclosure is installed on a loading box of a vehicle and where an upper portion of the loading box is opened.

Hereinafter, a folding type loading box cover assembly 200 having an articulated rail for a vehicle according to the present disclosure is described in detail with reference to the accompanying drawings. When a component, device, element, or the like of the present disclosure is described as having a purpose or performing an operation, function, or the like, the component, device, or element should be considered herein as being "configured to" meet that purpose or perform that operation or function. As used herein for the loading bay cover, upper and lower may refer to portions of the cover when in a folded condition. These same portions may lie generally in the same plane when the cover is in an unfolded or deployed condition and thus may not be considered as upper and lower in the unfolded or deployed condition.

The folding type loading box cover assembly 200 having an articulated rail for a vehicle according to the present disclosure includes a cover unit 30 including a plurality of slats 31. The cover unit 30, and the assembly 200, is selectively folded or unfolded to uncover or cover a loading box 10 of a vehicle 1. The assembly 200 includes a main rail 21 installed or disposed at an upper end portion of the loading box 10 of the vehicle 1 to extend in an unfolded direction of the cover unit 30 and for guiding lower ends of the plurality of slats 31 when folded and unfolded. The assembly 200 also includes an articulated rail 22 coupled with the main rail 21 and configured for guiding upper ends of the plurality of slats 31 when folded and unfolded. When the cover unit 30 is folded, the articulated rail 22 is separated from the main rail 21 to guide the upper ends of the plurality of slats 31.

The cover unit 30 may include the plurality of slats 31 whose upper ends and the lower ends are alternately connected to each other. The plurality of slats 31 is sequentially folded or unfolded to uncover or cover the loading box 10 of the vehicle 1.

The plurality of slats 31 may be connected in one direction of the vehicle 1, for example, in a longitudinal direction of the vehicle 1. The slats 31 are unfolded or folded in the longitudinal direction of the vehicle 1. When the slats 31 are unfolded, an upper portion of the loading box 10 is closed by the unfolded slats 31. When the slats 31 are folded, an area of the upper portion of the loading box 10 except for some sections occupied by the folded slats 31 may be opened.

Each slat 31 may be formed in the shape of a rectangle oriented to extend in a width direction of the vehicle 1 longer than in the longitudinal direction of the vehicle 1.

Figure 26:
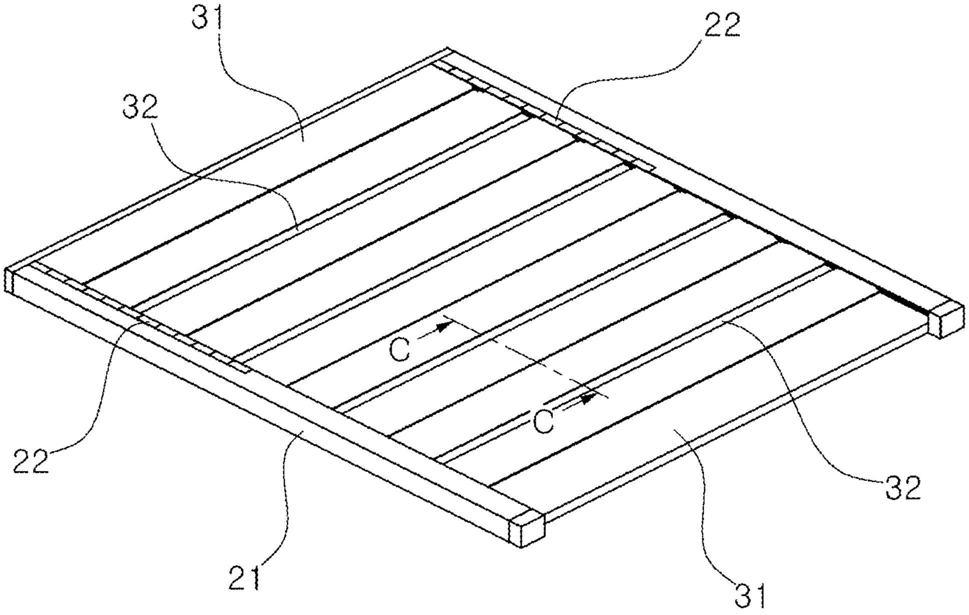
FIG. 26 is a perspective view illustrating a state in which a folding type loading box cover assembly for a vehicle having an articulated rail according to the present disclosure is unfolded.

A front end and rear end of each slat 31, which may form the upper and lower ends of the slats 31 in the folded condition, in the longitudinal direction of the vehicle 1 may be connected to adjacent slats 31 and folded together or fully unfolded in the longitudinal direction of the vehicle 1 (See FIG. 26). Various components are described below as being on one side of the assembly 200 and cover unit 30 for guiding and sliding the assembly between the folded and unfolded conditions. It should be understood that identical or mirroring components may also be provided on the other side of the assembly and cover unit. Various components are also described below as relating to two adjacent slats of the assembly 200 and cover unit 30. It should be understood that identical components may also be provided between other adjacent slats of the assembly and cover unit.

Figure 27:
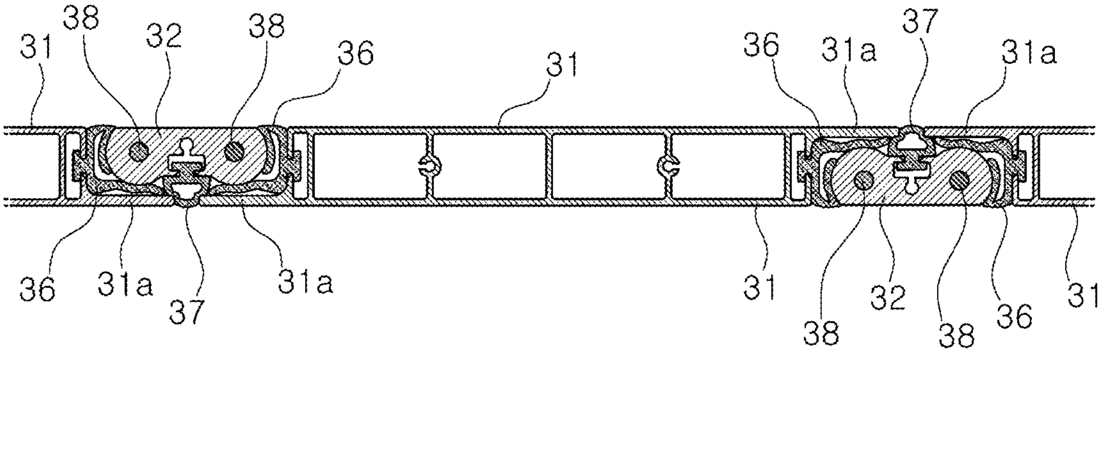
FIG. 27 is a cross-sectional view taken along line C-C of the assembly of FIG. 26.

A connector 32 may be provided to connect two adjacent slats 31 as shown in FIG. 27. The connector 32 may be disposed between the two adjacent slats 31, and a shaft 38 may pass through each slat 31 and the connector 32 so that the plurality of slats 31 are foldable. For example, both side ends of the plurality of slats 31 are bent and the shaft 38 passes through the bent portion and the connector 32 to connect the plurality of slats 31 to the connector 32, respectively.

The connector 32 connects the two adjacent slats 31 at an interval and the connected portion rotates around the shaft 38 to allow the cover unit 30 to be folded or unfolded.

Meanwhile, each of the plurality of slats 31 may have an extending portion **31*a* formed toward another slat 31 adjacent to an end portion thereof. When the cover unit 30 is unfolded and the plurality of slats 31 are disposed along a plane covering the loading box opening, the extending portion 31*a* may cover a space between each slat 31 and the connector 32. Weather strips 36 and 37**, as described below, are inserted for sealing the spaces.

Figure 14:
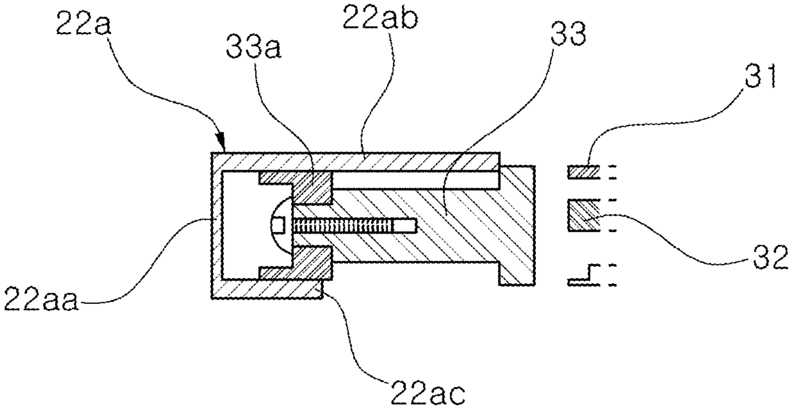
FIG. 14 is a cross-sectional view taken along line A-A of the assembly of FIG. 13.
Figure 14:
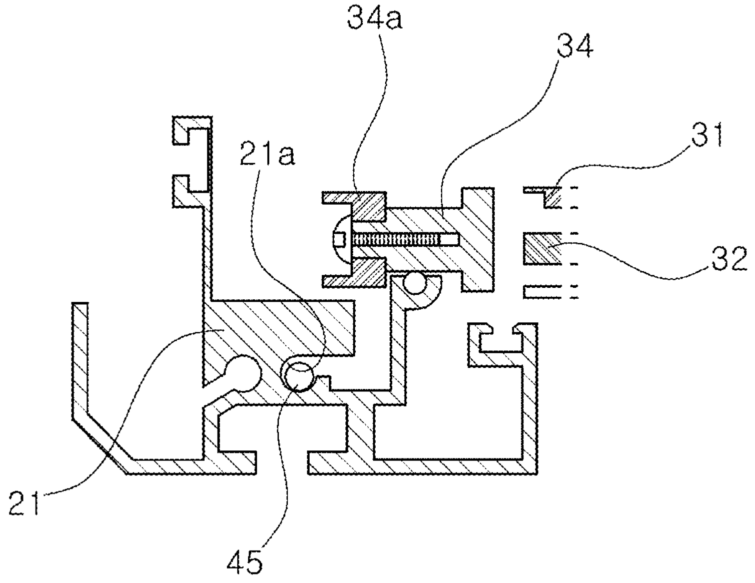

When the cover unit 30 is folded or unfolded, as shown in FIG. 14, a bracket 33 or a lower bracket 34 may be installed to guide the movement of the cover unit 30 and reduce friction. An upper slider **33*a* and a lower slider 34*a* are provided on the upper bracket 33 and the lower bracket 34**, respectively.

When the cover unit 30 is folded, the bracket 33 may be installed to connect the upper ends of the two adjacent slats 31. The upper slider **33*a* may be rotatably installed on the upper bracket 33. The upper slider 33*a*** may be provided in the form of a roller and make rolling contact during sliding to reduce friction.

Figure 15:
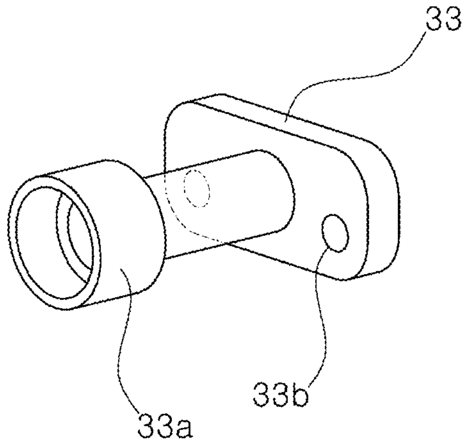
FIG. 15 is a perspective view of an upper bracket in a folding type loading box cover assembly for a vehicle having an articulated rail according to the present disclosure.

Referring to FIG. 15, a pair of through holes **33*b* may be formed in the upper bracket 33. The shaft 38 may be installed to pass through the through holes 33*b*, the slat 31, and the connector 32**.

When the cover unit 30 is folded, the lower bracket 34 may be installed to connect the lower ends of the two adjacent slats 31. The lower slider **34*a* in the form of a roller may also be installed on the lower bracket 34. The lower bracket 34 may be formed in the same form as that of the upper bracket 33, but installed so that the upper slider 33*a* is located further outward in an outward direction of the vehicle 1 than the lower slider 34*a*. Referring to FIG. 14, the upper slider 33*a* may be shown to be located further outward in an outward direction of the vehicle 1 than the lower slider 34*a*. This is to ensure that the upper slider 33*a* is branched from the main rail 21, as described below, to the articulated rail 22 when the cover unit 30** is folded from an unfolded state.

Meanwhile, weather strips 36 and 37 are provided to seal between the respective extension portions **31*a* of the two adjacent slats 31 and between each slat 31 and the connector 32 (see FIG. 27**).

The weather strips 36 and 37 may be a slat weather strip 36 for sealing between each slat 31 and the connector 32 when the plurality of slats 31 are unfolded. The slat weather strip 36 may be installed on an end portion of the slat 31 and provided in the form of surrounding the connector 32. The slat weather strip 36 may surround and contact an outer surface of the connector 32 when the plurality of slats 31 is unfolded or folded and seal between each slat 31 and the connector 32.

Alternatively, the weather strips 36 and 37 may be a connector weather strip 37 fastened to the connector 32 to seal between the two adjacent slats 31 when the plurality of slats 31 are unfolded. The connector weather strip 37 may be fastened to the connector 32 to seal between the plurality of slats 31 while deformed by being compressed between the end portions of each slat 31 when the plurality of slats 31 are unfolded.

Since sealing is achieved between the two adjacent slats 31 and between each slat 31 and the connector 32 through the weather strips 36 and 37, it is possible to prevent moisture or foreign substances from flowing into the loading box 10, thereby preventing contamination of the loading box 10 and the cargo loaded in the loading box 10.

The main rail 21 may be installed on the upper end of the loading box 10 of the vehicle 1 in the unfolding direction of the cover unit 30 and may guide the lower ends of the plurality of slat 31 for folding and unfolding.

Since the cover unit 30 is unfolded or folded in the longitudinal direction of the vehicle 1, the main rail 21 may be installed at the upper end of the loading box 10 in the longitudinal direction of the vehicle 1.

When the cover unit 30 is folded, the main rail 21 may accommodate the lower slider 34*a* installed to connect the lower ends of two adjacent slats 31 to guide the sliding of the lower slider 34*a*. In addition, the main rail 21 may also accommodate and guide the upper slider 33*a* (see FIG. 24) in a defined section from an end portion thereof, for example, a rear end of the main rail 21.

Therefore, in some sections, the main rail 21 may guide the sliding of the lower slider 34*a* when the cover unit 30 is folded. But when the cover unit 30 is unfolded, the main rail 21 may guide the upper slider 33*a* as well as the lower slider 34*a* in the remaining sections.

Referring to a cross section of the main rail 21 in FIG. 14, a groove accommodating the lower slider 34*a* and the upper slider 33*a* may be formed to guide the lower slider 34*a* and the upper slider 33*a* inside the main rail 21.

A cable slot 21*a* may be formed inside the main rail 21. The cable slot 21*a* may be formed in a direction which is the same as that of the main rail 21 and may be a passage through which the cable 45 moves when the cover unit 30 is unfolded or folded.

The articulated rail 22 may be installed on the main rail 21 and may guide the upper end of the folded slat 31. When the cover unit 30 is folded, the upper end of each slat 31 may move upward while being separated from the main rail 21. In this case, the articulated rail 22 may guide the sliding operation of the upper slider 33*a* to guide the upper end of each slat 31 folded.

Figure 4:
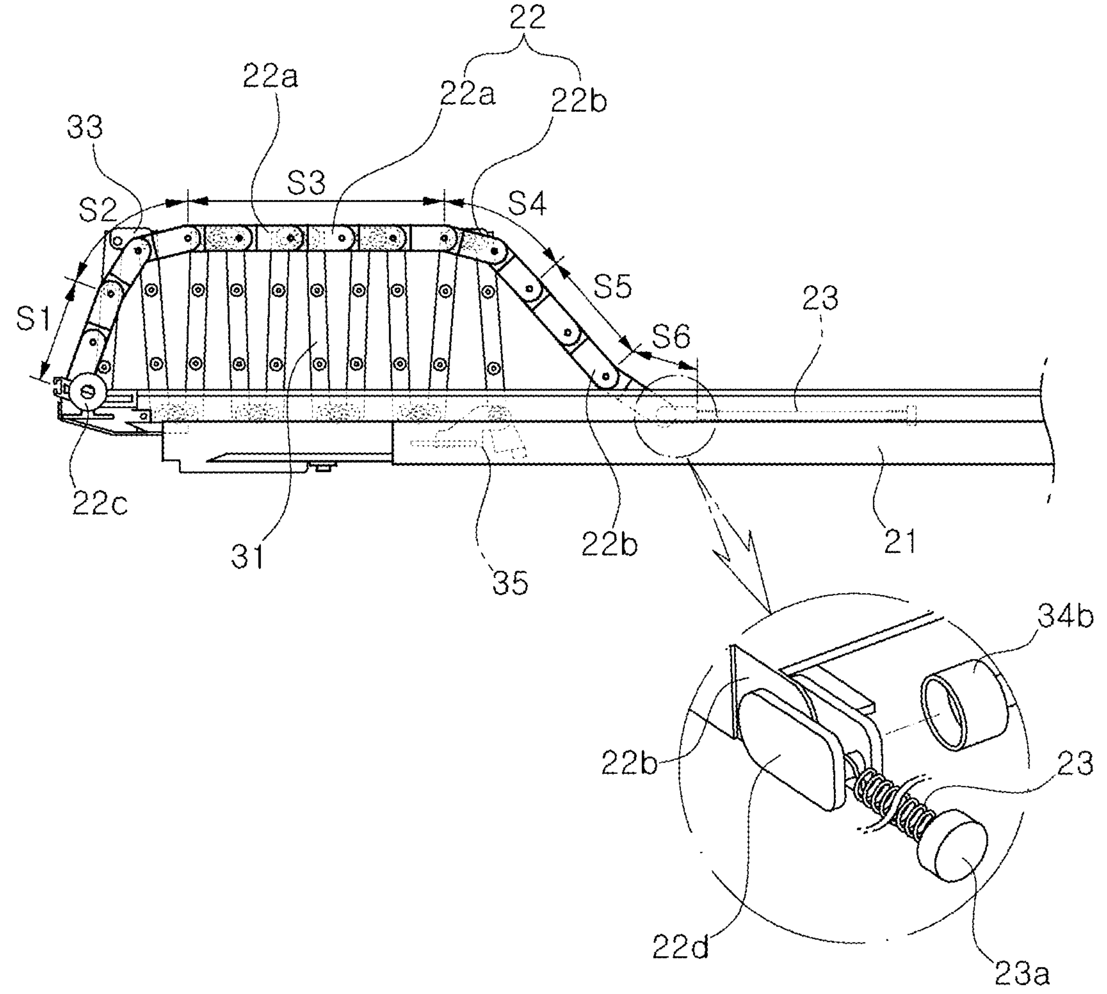
FIG. 4 is a side view of a folding type loading box cover assembly for a vehicle having an articulated rail according to the present disclosure.
Figure 5:
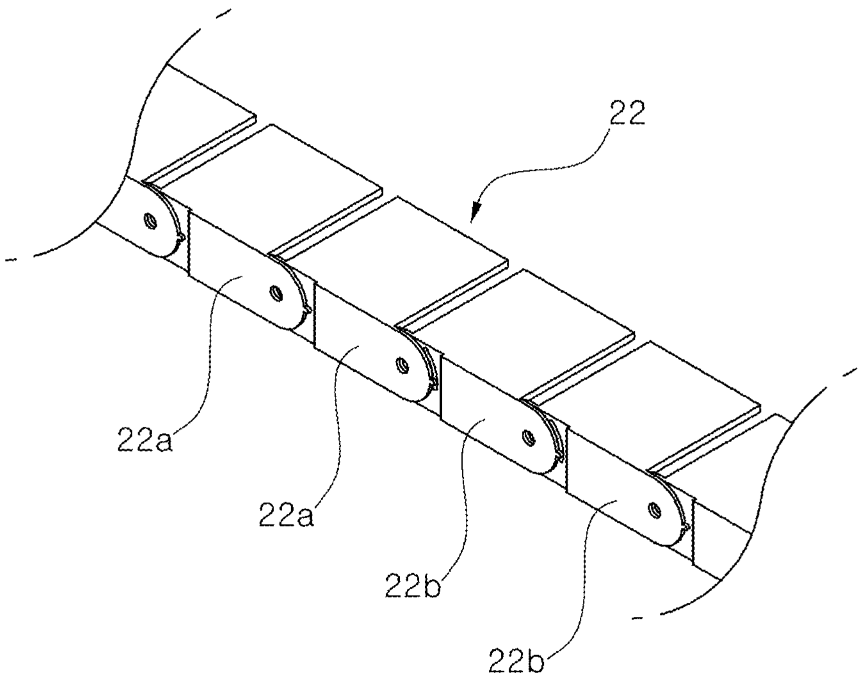
FIG. 5 is a perspective view of a variable rail in a folding type loading box cover assembly for a vehicle having an articulated rail according to the present disclosure.
Figure 6:
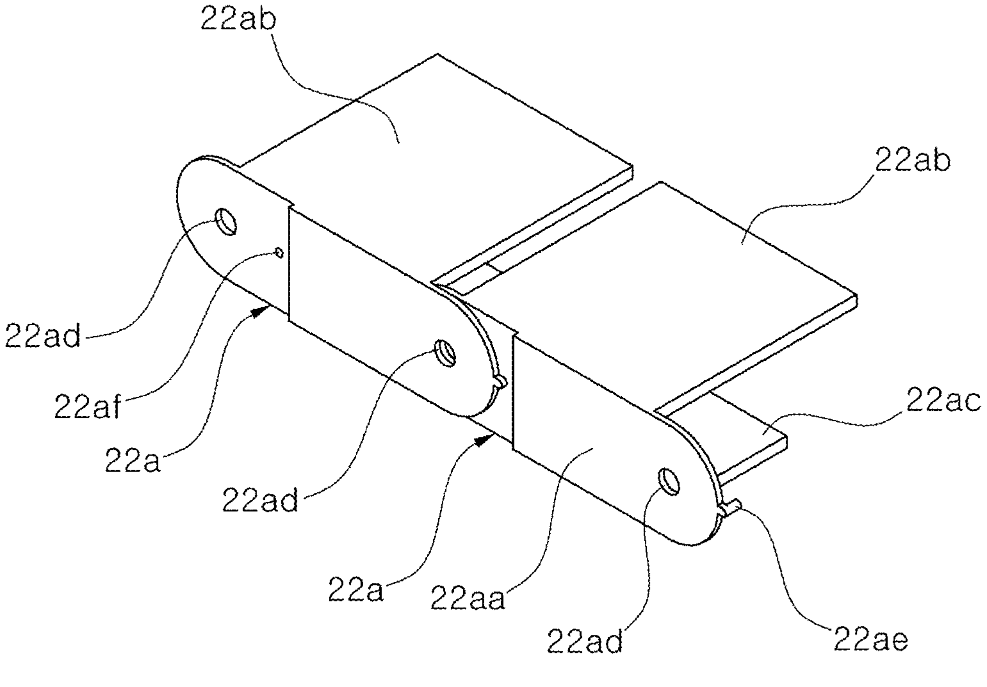
FIG. 6 is a perspective view of a first rail member of a variable rail in a folding type loading box cover assembly for a vehicle having an articulated rail according to the present disclosure.

The articulated rail 22 may be in a state of being folded to the main rail 21 in an unfolded state of the cover unit 30, but articulated in the folded state of the cover unit 30 and separated from the main rail 21. In FIG. 4, the folded state of the cover unit 30 is illustrated. When the folding of the cover unit 30 is finished, some sections of the articulated rail 22 may become linear sections and the remaining sections may become curved sections. In other words, as shown in FIG. 4, section S1, section S3, and section S5 may become the linear sections, and section S2, section S4, and section S6 may become the curved sections. The articulated rail 22 may include a first rail member 22*a* and a second rail member 22*b* to implement the linear sections and the curved sections. The first rail member 22*a* may maintain a linear shape when the articulated rail 22 is separated from the main rail 21, and the second rail member 22*b* may become a curved or bent shape when the articulated rail 22 is separated from the main rail 21. The first rail member 22*a* and the second rail member 22*b* may be connected to form both the linear section and the curved section in the articulated rail 22. The linear section may be formed by connecting the first rail members 22*a*, the curved section may be formed by connecting the second rail members 22*b*, and the first rail member 22*a* and the second rail member 22*b* may be connected in a portion in which the linear section and the curved section are connected.

The first rail member 22*a* and the second rail member 22*b* are described as follows.

Figure 7:
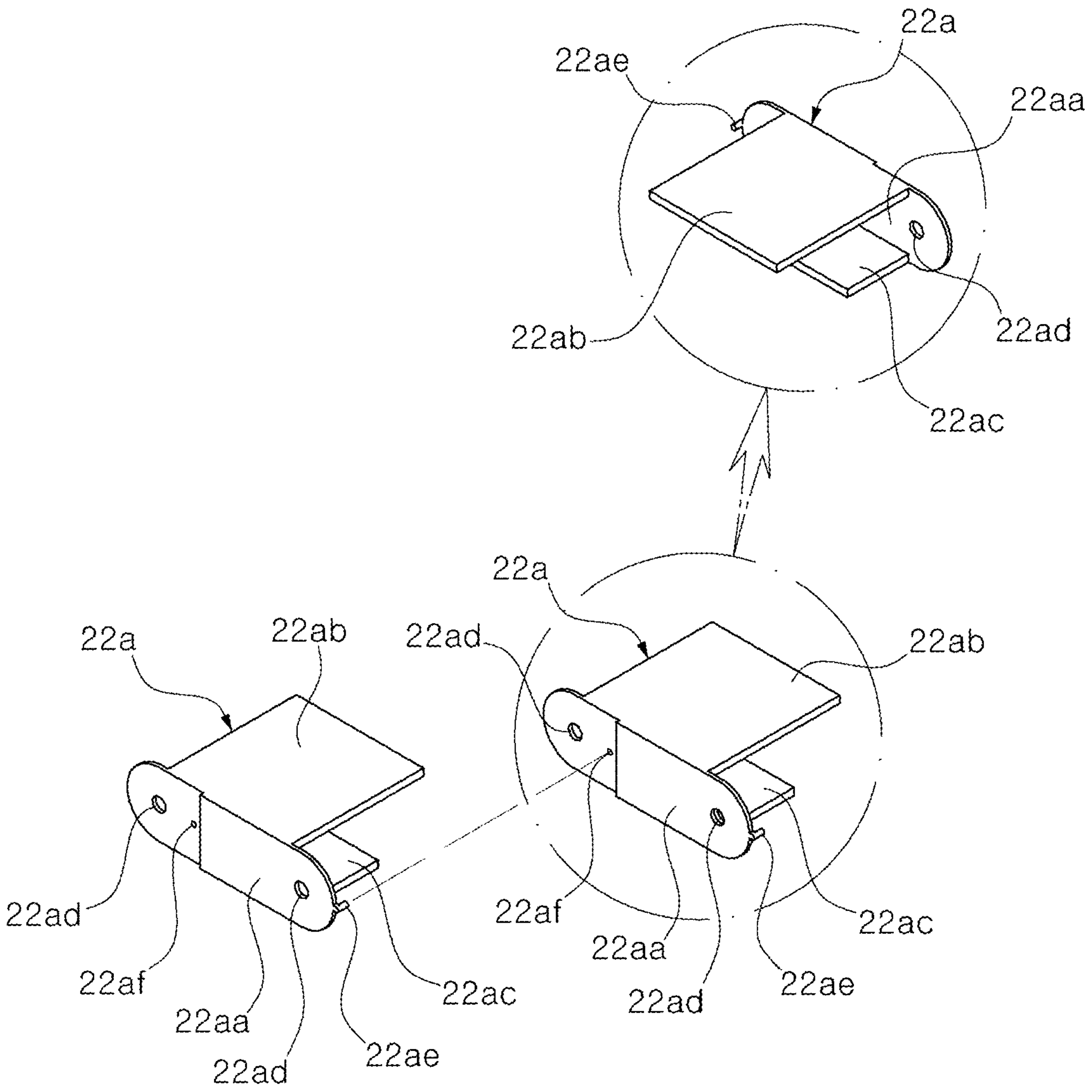
FIG. 7 is an exploded perspective view of the first rail member of the variable rail of FIG. 6.
Figure 8:
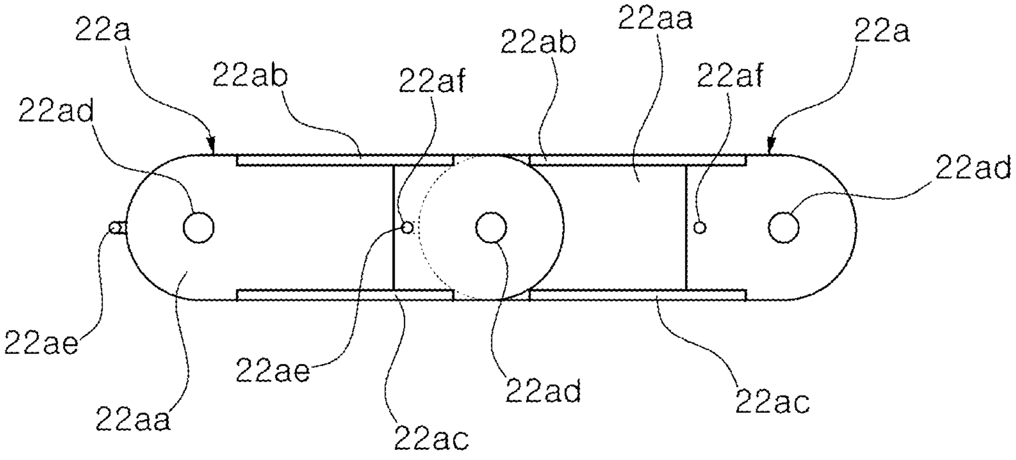
FIG. 8 is a rear or inside view of the first rail member of the variable rail of FIGS. 6 and 7.
Figure 9:
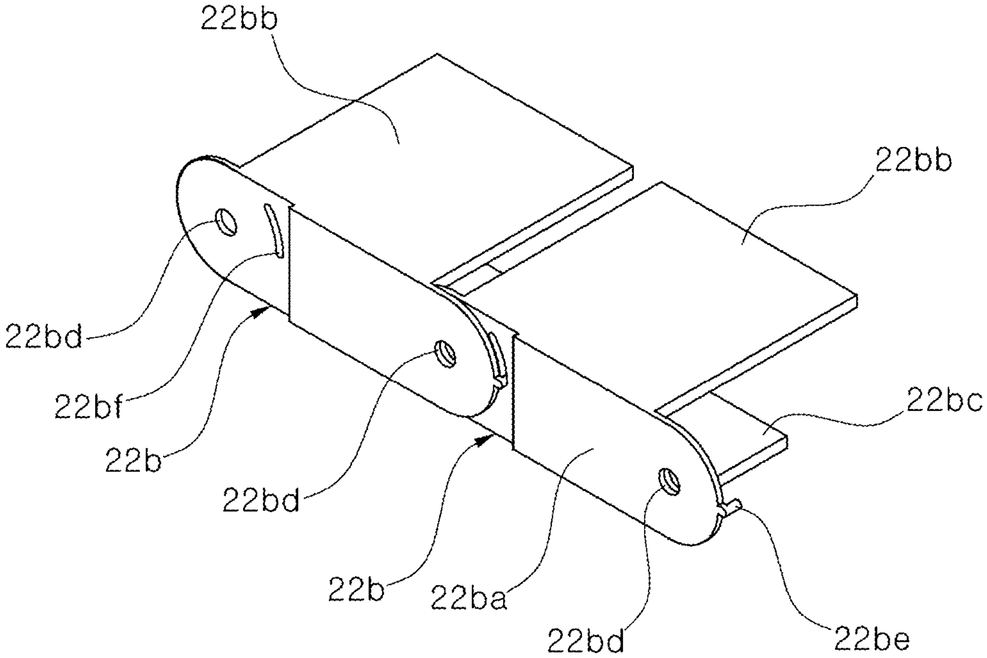
FIG. 9 is a perspective view of a second rail member of a variable rail in a folding type loading box cover assembly for a vehicle having an articulated rail according to the present disclosure.

First, referring to FIG. 7, the first rail member 22*a* may include a first body 22*aa*, a first upper guide 22*ab* extending from an upper end of the first body 22*aa* toward the inside of the vehicle 1 (i.e., laterally inward) by a predetermined length, and a first lower guide 22*ac* extending from a lower end of the first body 22*aa* toward the inside of the vehicle 1 (i.e., laterally inward) by a predetermined length. The first rail member 22*a* may also include a first connection hole 22*ad* hinge-connected to another first rail member 22*a* disposed to overlap the first rail member 22*a* or the second rail member 22*b*, a first connection hook 22*ae* fitted into the first rail member 22*a* disposed to overlap the first rail member 22*a* or the second rail member 22*b*, and a fastening hole 22*af* into which the first connection hook 22*ae* or a second connection hook 22*be* formed on the second rail member 22*b* is fitted.

Each component of the first rail member 22*a* may be formed on the first body 22*aa.*

The first upper guide 22*ab* and the first lower guide 22*ac* may extend from the upper end and lower end of the first body 22*aa*, respectively. The upper slider 33*a* may be guided between the first upper guide 22*ab* and the first lower guide 22*ac*. The first upper guide 22*ab* and the first lower guide 22*ac* may be formed in a plate shape to guide the upper slider 33*a* and extend from the first body 22*aa.*

Meanwhile, an end portion of the first upper guide 22*ab* may extend to be located in an inward direction of the vehicle 1 beyond an end portion of the first lower guide 22*ac*. In other words, a width of the first upper guide 22*ab* (length in a direction perpendicular to the folding direction of the cover unit, i.e., toward the inward direction of the vehicle) may be formed to be greater than a width of the first lower guide 22*ac* to prevent the upper slider 33*a* from being separated upward.

The first connection hole 22*ad* may be formed or disposed on the first body 22*aa* and may be used for hinge-connection with another adjacent first rail member 22*a* or second rail member 22*b*. Two first connection holes 22*ad* may be formed or disposed at a predetermined interval so that the first rail member 22*a* is connected to another first rail member 22*a* or second rail member 22*b* at both sides thereof.

The first connection hook 22*ae* may be fitted into another adjacent first rail member 22*a* or second rail member 22*b*. The first connection hook 22*ae* may be formed to protrude from the first body 22*aa.*

The fastening hole 22*af* may be formed or disposed in the first body 22*aa*, and the first connection hook 22*ae* or the second connection hook 22*be* formed or disposed on the second rail member 22*b* may be fitted into the fastening hole 22*af.* Since the fastening hole 22*af* does not allow the first connection hook 22*ae* and the second connection hook 22*be* to rotate relatively when the first connection hook 22*ae* or the second connection hook 22_be_ is fitted into the fastening hole 22_af_, the connected first and the second rail members 22_a_ and 22_b_ may form a portion of the linear section.

Figure 10:
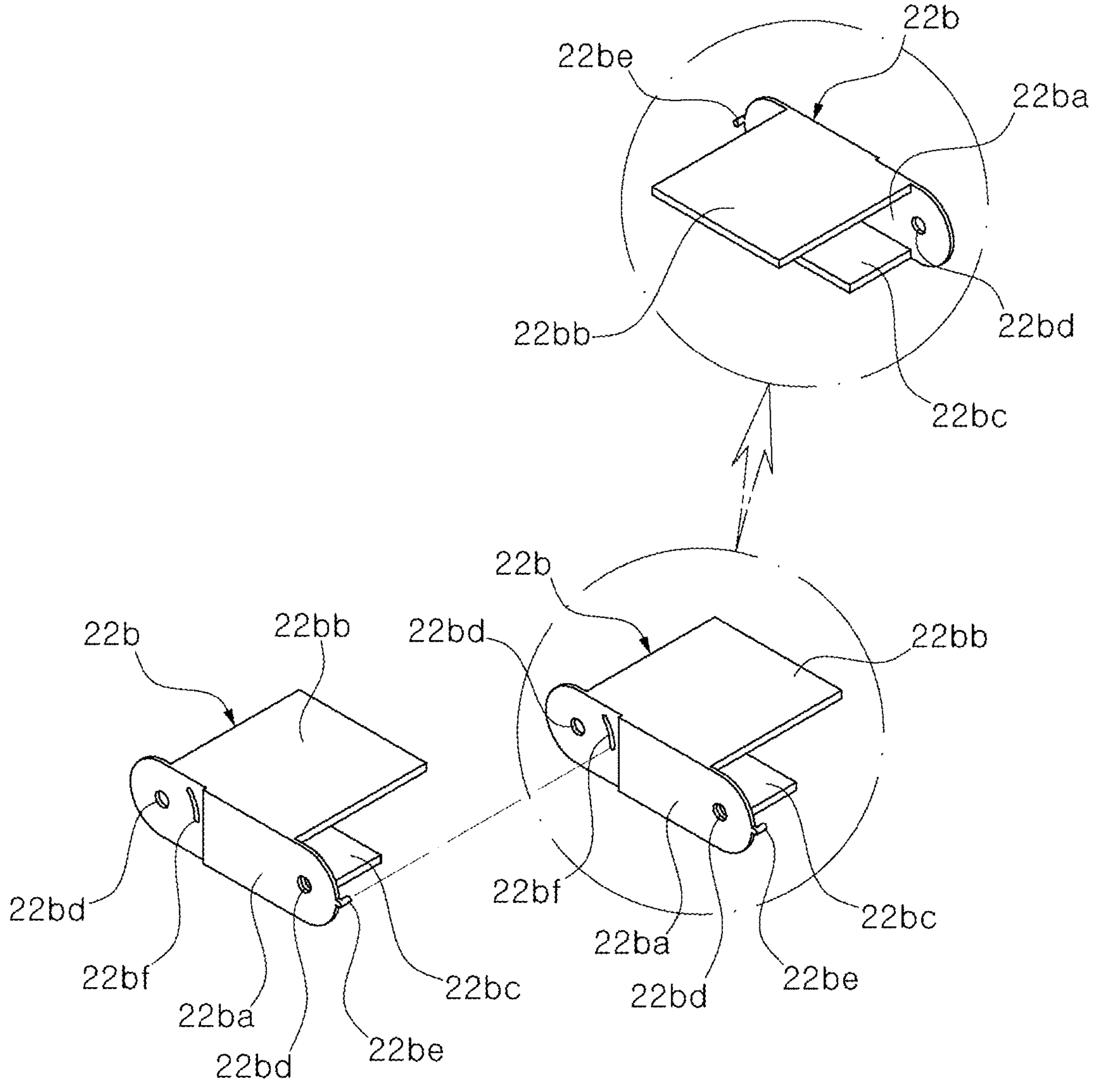
FIG. 10 is an exploded perspective view of the second rail member of the variable rail of FIG. 9.
Figure 11:
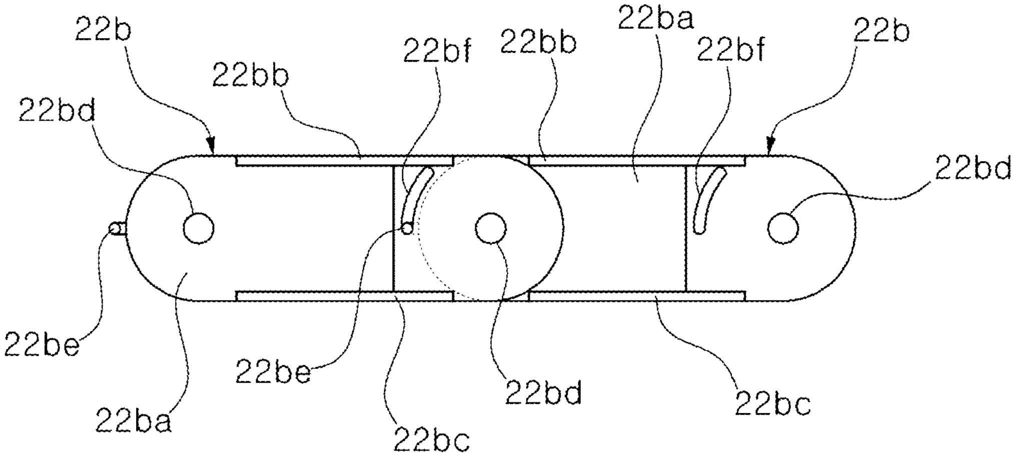
FIG. 11 is a rear or inside view of the second rail member of the variable rail of FIGS. 9 and 10.
Figure 12:
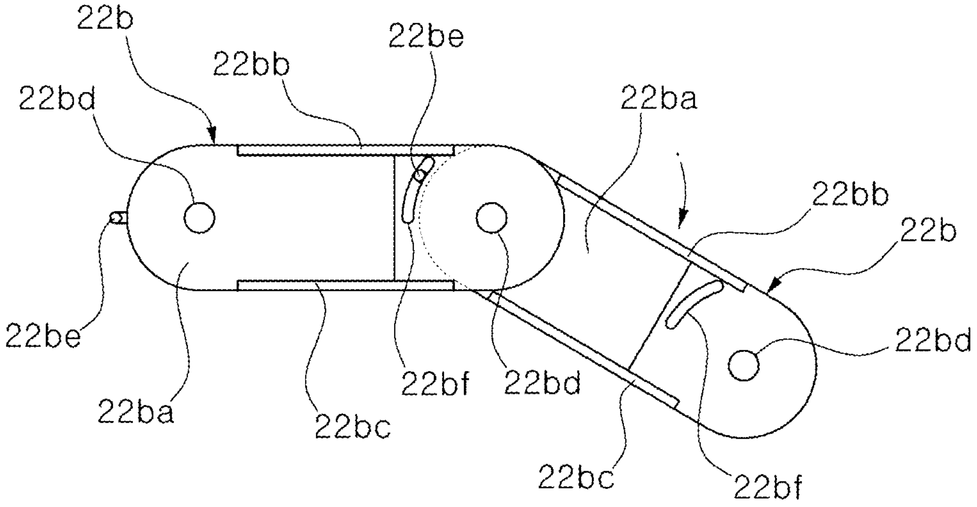
FIG. 12 is a rear or inside view illustrating a state in which the second rail member of the variable rail is articulated in a folding type loading box cover assembly for a vehicle having an articulated rail according to the present disclosure.
Figure 13:
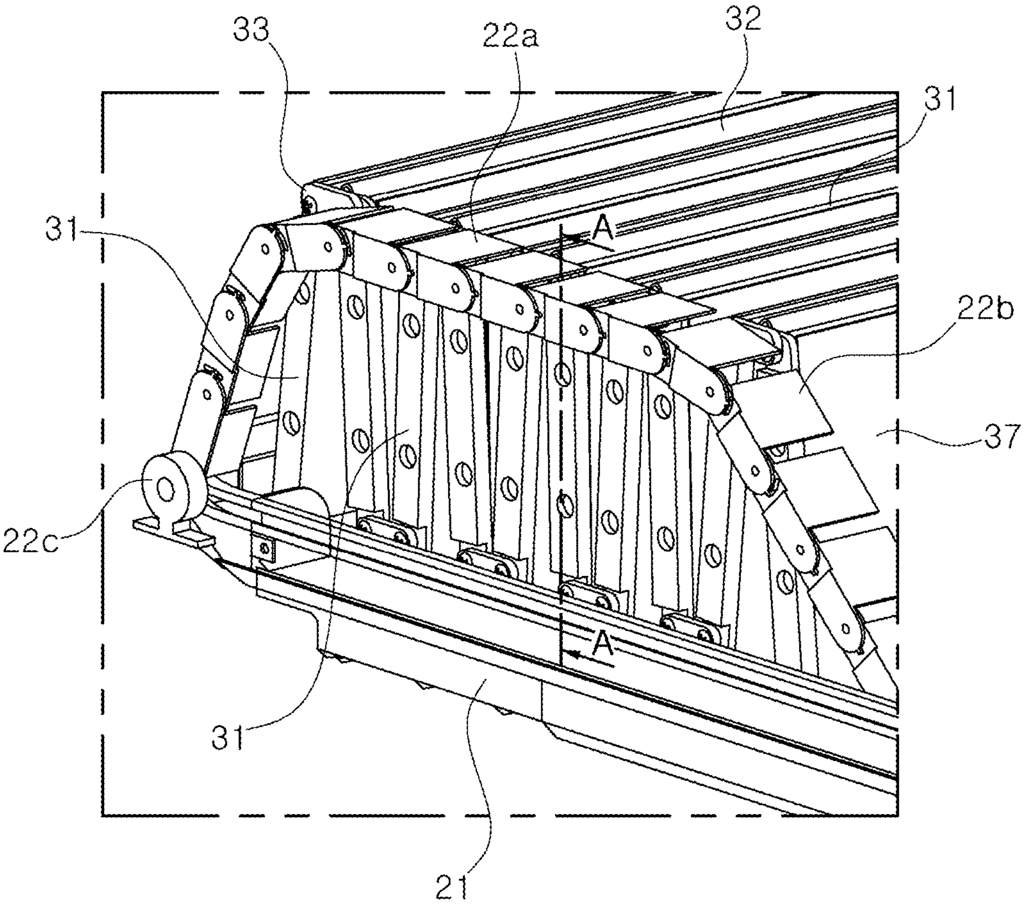
FIG. 13 is a perspective view of main parts of a folding type loading box cover assembly for a vehicle having an articulated rail according to the present disclosure.

Meanwhile, referring to FIG. 10, the second rail member 22_b_ may include a second body 22_ba_, a second upper guide 22_bb_ extending from an upper end of the second body 22_ba_ toward the inside of the vehicle 1 by a predetermined length, and a second lower guide 22_bc_ extending from a lower end of the second body 22_ba_ toward the inside of the vehicle 1 by a predetermined length. The second rail member 22_b_ may include a second connection hole 22_bd_ hinge-connected to another second rail member 22_b_ disposed to overlap the second rail member 22_b_ or the first rail member 22_a_, a second connection hook 22_be_ fitted into the second rail member 22_b_ disposed to overlap the second rail member 22_b_ or the first rail member 22_a_, and a slit 22_bf_ into which the second connection hook 22_be_ or a first connection hook 22_ae_ formed on the first rail member 22_a_ may be fitted.

The second rail member 22_b_ may be basically formed similar to the first rail member 22_a_. However, the fastening hole 22_af_ may be formed or disposed in the first rail member 22_a_, but the slit 22_bf_ may be formed or disposed in the second rail member 22_b_. In other words, the second rail member 22_b_ may be formed in the same form as that of the first rail member 22_a_ except that the slit 22_bf_ instead of the fastening hole 22_af_ is formed therein.

The rail member 22_a_ and 22_b_ may rotate at predetermined angles with respect to an adjacent second rail member 22_b_ or first rail member 22_a_ through the second connection hook 22_be_ or the first connection hook 22_ae_ coupled with the slit 22_bf_. Therefore, the two connected rail members 22_a_ and 22_b_ may be articulated to form a portion of the curved section.

The first rail member 22_a_ and the second rail member 22_b_ may be connected to form the articulated rail 22. The first rail member 22_a_ and the second rail member 22_b_ may each be connected to another first rail member 22_a_ or another second rail member 22_b_ in the same manner as a chain using the first connection hole 22_ad_ or the second connection hole 22_bd_. In other words, by overlapping the two first rail members 22_a_ or second rail members 22_b_ and allowing a connection pin (not illustrated) to pass through the first connection hole 22_ad_ and the second connection hole 22_bd_ to connect the first rail members 22_a_ or the second rail members 22_b_, the articulated rail 22 may have the same shape as a chain when viewed from a side.

However, when the first connection hook 22_ae_ of another first rail member 22_a_ or the second connection hook 22_be_ of the second rail member 22_b_ is fitted into the fastening hole 22_af_ of the first rail member 22_a_, mutual rotation is not possible, thereby forming the linear section.

Meanwhile, when the second connection hook 22_be_ of another second rail member 22_b_ or the first connection hook 22_ae_ of the first rail member 22_a_ is fitted into the slit 22_bf_ of the second rail member 22_b_, mutual rotation is possible, thereby forming the curved or bent section.

The slit 22_bf_ may be formed in an arc shape and may rotate the two rail members 22_a_ and 22_b_ disposed to overlap each other at predetermined angles.

In addition, a center line of the slit 22_bf_ may become a portion of a circle around any one of the second connection holes 22_bd_.

In addition, the slit 22_bf_ may be formed in a different direction according to rotational directions of the two adjacent rail members 22_a_ and 22_b_. In other words, referring to FIG. 22, positions of the slit 22_bf_ of the second rail member 22_b_ located at the right side and the slit 22_bf_ of the second rail member 22_b_ located at the left side are illustrated differently.

The articulated rail 22 may come into contact with the main rail 21 when the cover unit 30 is fully unfolded and may spread parallel to the ground, i.e., to the upper end of the loading box 10. The articulated rail 22 may be separated from the main rail 21 when the cover unit 30 is folded. Meanwhile, in a section of the main rail 21 in which the articulated rail 22 is unfolded and comes into contact with the main rail 21, an upper portion of the main rail 21 may have an open shape. In other words, when the articulated rail 22 is spread parallel to the loading box 10 and comes into contact with the main rail 21, the articulated rail 22 may cover the open main rail 21. Referring to FIG. 14, the upper portion of the main rail 21 is illustrated as open. In addition, even when the articulated rail 22 is unfolded on the main rail 21, the upper portion of the main rail 21 may be in a closed state in a section in which the main rail 22 does not come into contact with the articulated rail 22 (see FIG. 24). Therefore, when the articulated rail 22 is fully unfolded, a portion of the main rail 21 may be covered by the articulated rail 22 and the remaining sections may be covered by the main rail 21 itself and thus covered by the entirety of the main rail 21. In particular, the reason why a width of the first upper guide 22_ab_ in a widthwise direction of a vehicle is greater than that of the first lower guide 22_ac_ and a width of the second upper guide 22_bb_ in a widthwise direction of a vehicle is greater than the second lower guide 22_bc_ may be because, when the articulated rail 22 comes into contact with the main rail 21, the first upper guide 22_ab_ and the second upper guide 22_bb_ may cover both the upper slider 33_a_ and the lower slider 34_a_ as well as may prevent the upper slider 33_a_ from separated upwards. But the first lower guide 22_ac_ and the second lower guide 22_bc_ may support only a bottom surface of the upper slider 33_a_.

A front end of the articulated rail 22, as shown in FIG. 4, may be rotatably installed on the main rail 21 through a rail mount 22_c_. Among the first rail member 22_a_ and the second rail member 22_b_ constituting the articulated rail 22, front ends of the rail members 22_a_ and 22_b_ disposed at the forefront of the articulated rail 22 may be hinge-connected to the rail mount 22_c_ fixed to the main rail 21. Therefore, when the articulated rail 22 is separated from the main rail 21, the front end of the articulated rail 22 may rotate with respect to the main rail 21.

Meanwhile, a return spring 23 may be installed at a rear end of the articulated rail 22. The return spring 23 may elastically support the rear end of the articulated rail 22 to be pulled to a rear end of the vehicle 1. The return spring 23 may have a front end connected to the rear end of the articulated rail 22 and a rear end fixed to one side of the main rail 21. For example, the return spring 23 may have a front end connected to the rail members 22_a_ and 22_b_ located at the rearmost end of the articulated rail 22 among the rail members 22_a_ and 22_b_ through a spring bracket 22_d_. The return spring 23 may have a rear end connected to a spring holder 23_a_ fixedly installed on the main rail 21. The return spring 23 thereby elastically supports the articulated rail 22 in a rearward direction of the vehicle 1.

Since the articulated rail 22 is elastically supported by the return spring 23 so that the rear end of the articulated rail 22 is pulled toward the rear of the vehicle 1, when the cover unit 30 is unfolded, the articulated rail 22 may not be articulated and the entirety thereof may become a straight line to come into contact with the main rail 21 to flatten the cover unit 30.

Figure 18:
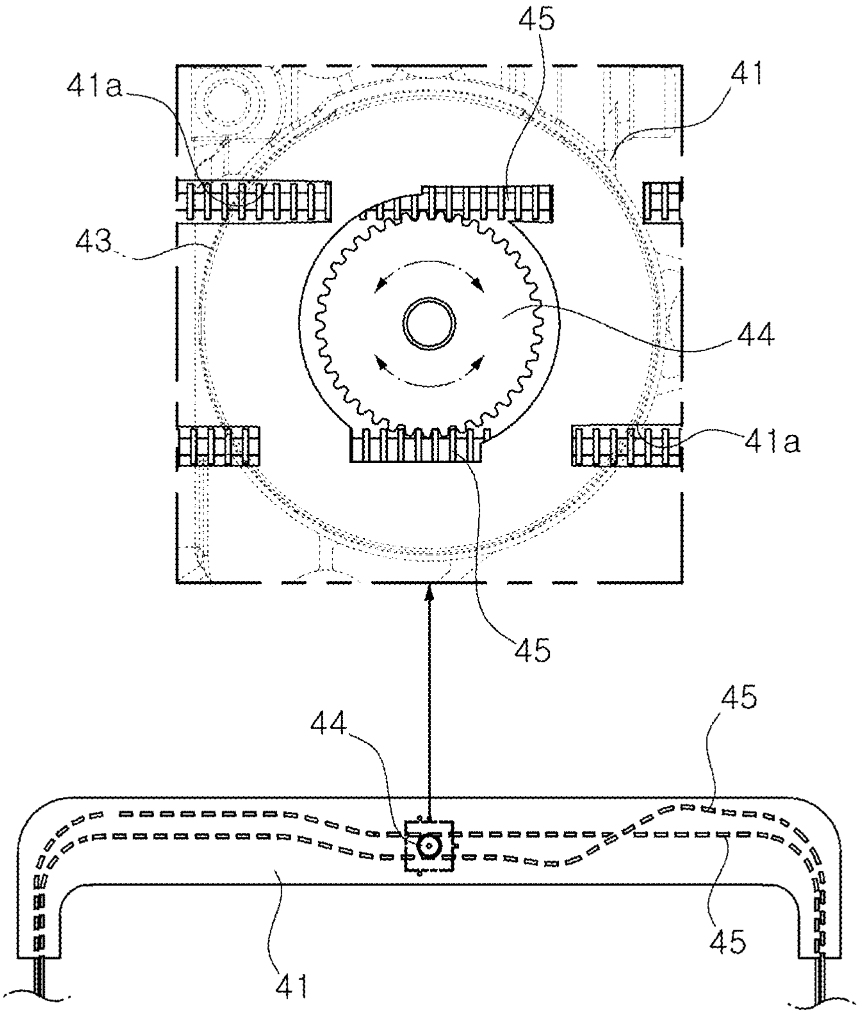
FIG. 18 is a side view illustrating a state in which a cable is installed on a housing in a folding type loading box cover assembly for a vehicle having an articulated rail according to the present disclosure.

The loading box 10, as shown in FIG. 18, may be provided with a driving motor 43 for folding or unfolding the cover unit 30 and with a cable 45 for transmitting a driving force of the driving motor 43 to the cover unit 30.

A housing 41 may be provided for installing the driving motor 43 at one side of the loading box 10, for example, at a front end of the loading box 10. A cover 42 for covering the housing 41 may be installed and the driving motor 43 may be installed in the housing 41. The driving motor 43 may operate when power is applied to allow the cover unit 30 to be unfolded or folded. A cable groove 41*a* in which the cable 45 is accommodated may be formed in the housing 41.

A driving gear 44 may be fixed to the driving motor 43, and the driving gear 44 may be rotated by the driving motor 43. The driving gear 44 may transmit the driving force of the driving motor 43 to the cable 45. The driving gear 44 may be a spur gear with teeth formed therearound.

The cable 45 may be formed to be engaged with the driving gear 44. A spiral may be formed on an outer circumferential surface of the cable 45 or teeth may be formed in the longitudinal direction on the cable 45 to be engaged with the driving gear 44. The cable 45 may have flexibility to be bent along a shape of the cable slot 21*a* and may have appropriate rigidity so that the cable 45 pushes a carrier 35 to which the other end of the cable 45 is connected.

Figure 16:
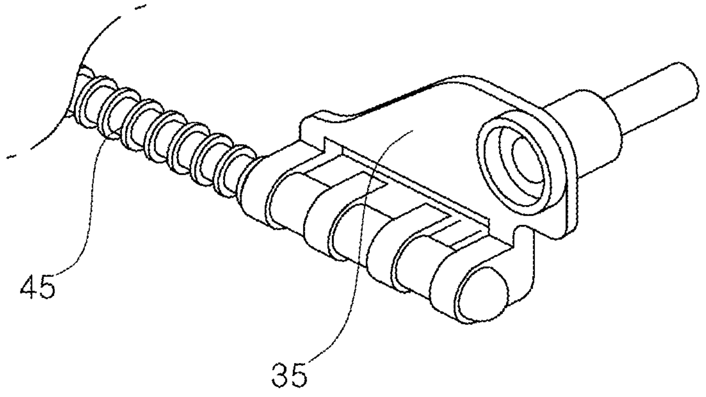
FIG. 16 is a perspective view of a carrier in a folding type loading box cover assembly for a vehicle having an articulated rail according to the present disclosure.
Figure 17:
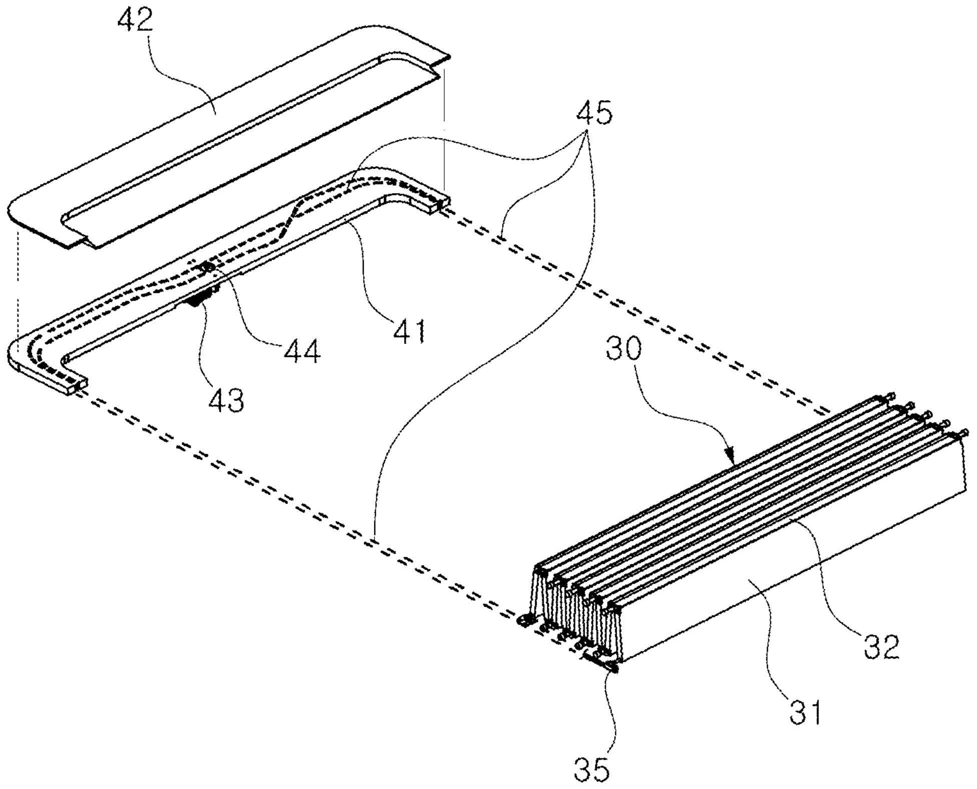
FIG. 17 is an exploded perspective view illustrating the installation relationship between a slat and a cable in a folding type loading box cover assembly for a vehicle having an articulated rail according to the present disclosure.

Although the cable 45 is shown as being installed in pairs between the housing 41 and the cover 42, the two cables 45 may each be connected to the driving gear 44 and at least the rearmost the slat 31 of the cover unit 30, which is positioned at the rearmost end of the vehicle 1. FIG. 16 illustrates the carrier 35 connecting a first end of the cable 45 to the rearmost slat 31 of the plurality of slats 31. The carrier 35 may be fixed to the slat 31, and the first end of the cable 45 may be fixed to the carrier 35. A second end of the cable 45 may be engaged with the driving gear 44, and the first end of the cable 45 may be connected to the rearmost slat 31 installed at the rearmost side through the cable slot 21*a*. The two cables 45 may be engaged with the driving gear 44 and, according to a rotating direction of the driving gear 44, the cables 45 may be pulled toward the driving gear 44 or moved or pushed in an opposite direction.

An operation of the folding type loading box cover assembly 200 for a vehicle 1 having the articulated rail 22 according to the present disclosure having the above configuration is described as follows.

Figure 19:
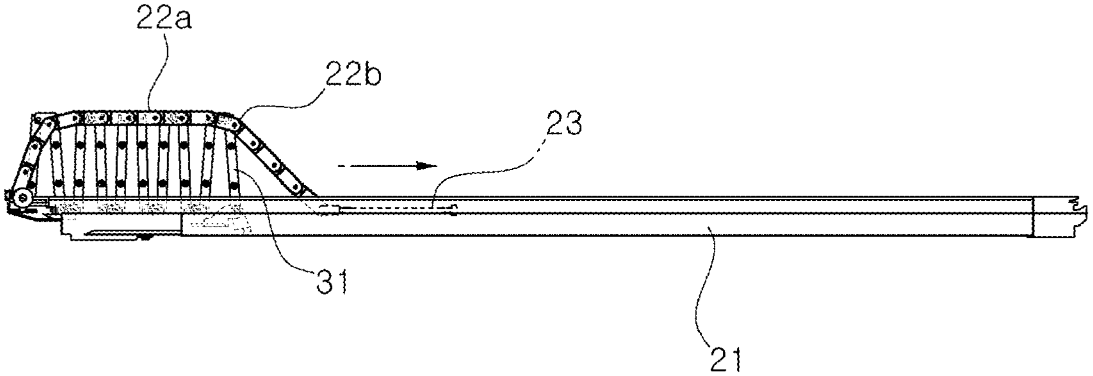
FIG. 19 is a side view illustrating a state in which a folding type loading box cover assembly for a vehicle having an articulated rail according to the present disclosure is folded.
Figure 20:
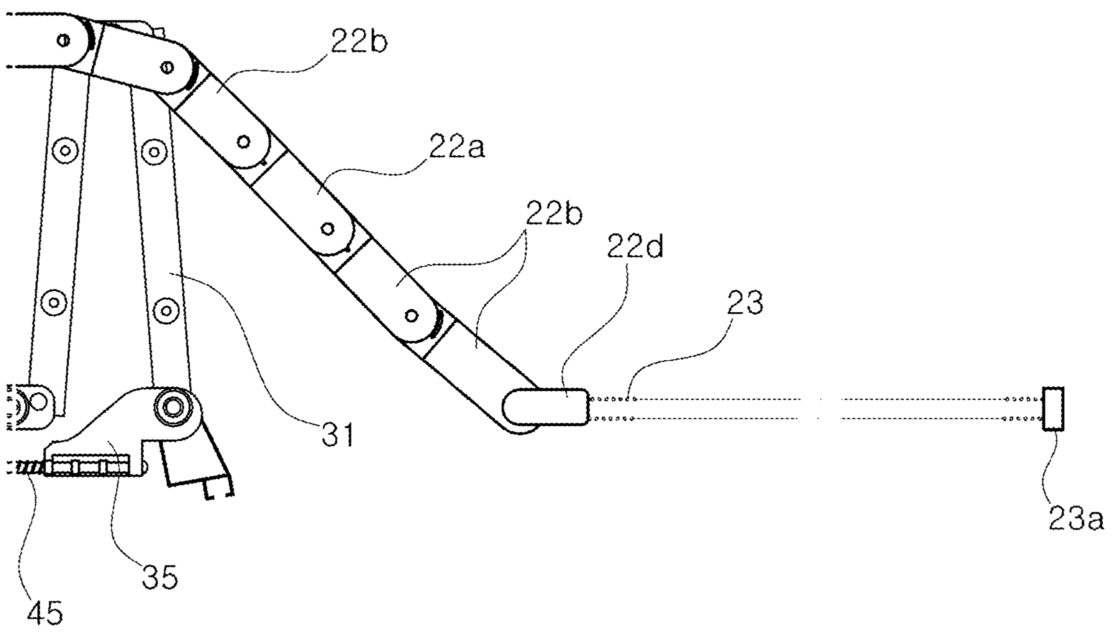
FIG. 20 is a side view illustrating a variable rail in a state in which a folding type loading box cover assembly for a vehicle having an articulated rail according to the present disclosure is folded.

FIGS. 19 and 20 illustrate a folded state of the cover unit 30. In other words, the plurality of slats 31 may be aligned in an upright position, and the articulated rail 22 may be in a state in which a middle portion except for the front and rear ends is separated from the main rail 21. In this state, the middle portion of the articulated rail 22 may be in a state of being maximally separated from the main rail 21, and the plurality of slats 31 may be in a state of being aligned substantially perpendicular to the ground, i.e., a plane of the upper end of the loading box 10.

In this state, since the upper portion of the loading box 10 is opened, cargo may be loaded in the loading box 10 or the cargo may be unloaded from the loading box 10.

From this state, when the driving motor 43 is operated in a first direction to close the cover unit 30, the driving motor 43 may rotate the driving gear 44, and the cable(s) 45 may start to move to the rear of the vehicle 1.

When the cable(s) 45 moves to the rear of the vehicle 1, the carrier 35 together with the second end of the cable(s) 45 may also start to move to the rear of the vehicle 1, and the cover unit 30 may start to be unfolded.

Figure 21:
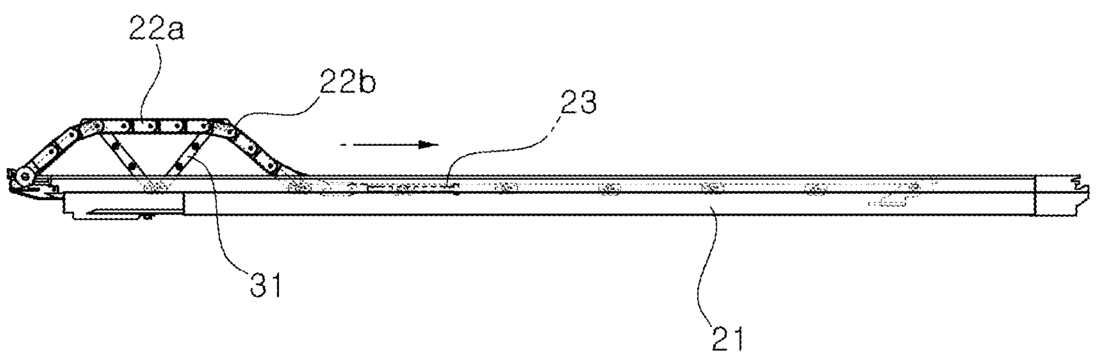
FIG. 21 is a side view illustrating a state in which a folding type loading box cover assembly for a vehicle having an articulated rail according to the present disclosure is being unfolded.
Figure 22:
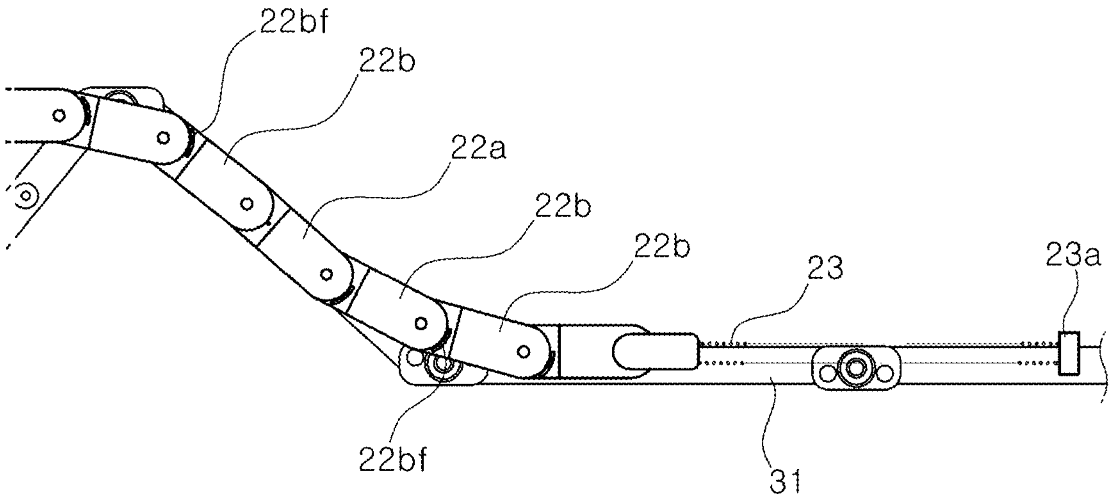
FIG. 22 is a side view illustrating a variable rail in a state in which a folding type loading box cover assembly for a vehicle having an articulated rail according to the present disclosure is being unfolded.

FIGS. 21 and 22 illustrate an intermediate state in which the cover unit 30 is gradually and sequentially being unfolded.

Referring to FIG. 21, as the cable(s) 45 moves toward the rear of the vehicle 1, the carrier 35 may pull the rearmost slat 31 positioned at the rearmost side of the cover unit 30 and then gradually move the plurality of slats 31 toward the rear of the vehicle. Thus, some of the plurality of slats 31 become in a state of being inclined from a state of being perpendicular to the loading box 10 while the remaining slats 31 also move sequentially.

In this case, the articulated rail 22 may move down and the upper ends of the plurality of slats 31 move down, while the return spring 23 may also pull the articulated rail 22 toward the rear of the vehicle 1.

As described above, while the cover unit 30 is unfolded, a height of the upper ends of the plurality of slats 31 is lowered, and in conjunction with this, the articulated rail 22 may also become closer to the main rail 21. In particular, as the second rail members 22*b* installed in the curved section of the articulated rail 22 rotate, the articulated rail 22 may be closer to the main rail 21.

Figure 23:
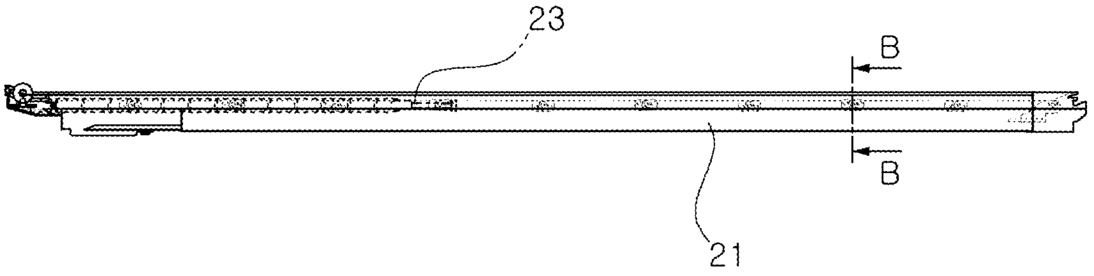
FIG. 23 is a side view illustrating a state in which a folding type loading box cover assembly for a vehicle having an articulated rail according to the present disclosure is unfolded.
Figure 24:
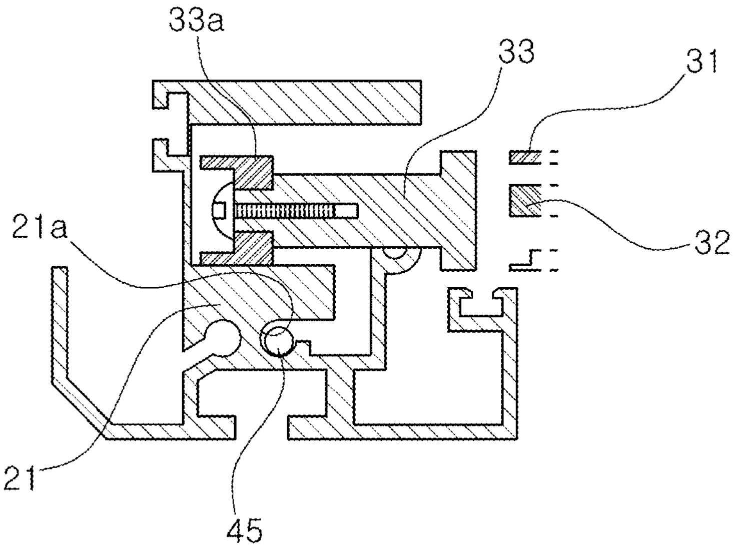
FIG. 24 is a cross-sectional view taken along line B-B of the assembly of FIG. 23.
Figure 25:
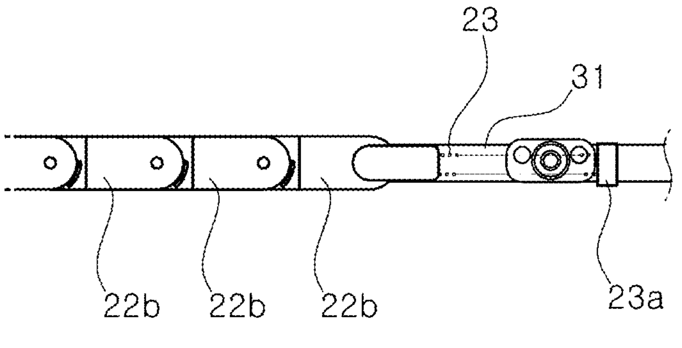
FIG. 25 is a side view illustrating a variable rail in a state in which a folding type loading box cover assembly for a vehicle having a articulated rail according to the present disclosure is unfolded.

FIGS. 23 and 24 illustrate a state in which the cover unit 30 is fully unfolded.

When the cable(s) 45 maximally moves toward the rear of the vehicle 1, the plurality of slats 31 of the cover unit 30 may become in a state of being substantially parallel to the loading box 10.

In addition, the return spring 23 may exert elastic force to pull the rear end of the articulated rail 22 toward the rear of the vehicle 1. Therefore, since the second rail member 22*b* is disposed colinearly with adjacent other rail members 22*a* and 22*b* in the articulated rail 22, the articulated rail 22 may take a linear shape, in close contact with the main rail 21 with being fully unfolded so that the plurality of slat 31*s* is also parallel to the loading box 10.

As illustrated in FIG. 26, when the cover unit 30 is fully unfolded, the upper portion of the loading box 10 may be closed. In addition, when the cover unit 30 is fully unfolded, each of the plurality of slats 31 and the connectors 32 may be sealed by the slat weather strips 36 and/or the connector weather strips 37 installed on the slats 31 and the connectors 32.

Meanwhile, in order to open the loading box 10 by folding the cover unit 30 from a state in which the cover unit 30 is unfolded and the cover unit 30 closes the loading box 10, the above-described unfolding process of the cover unit 30 may be performed in reverse order.

In other words, when the driving motor 43 rotates reversely, i.e., in a second direction when the portion in which the upper brackets 33 are installed moves up as the cable(s) 45 pulls the rear end of the rearmost slat 31 toward the front of the vehicle 1 so that the plurality of slats 31 is in a state of being inclined from the main rail 21, the upper brackets 33 may move up, and the articulated rail 22 may start to move up toward the front of the vehicle 1 and be separated from the main rail 21.

Thereafter, when the cable(s) 45 maximally pulls the plurality of slats 31, the plurality of slats 31 may return to the state of being perpendicular to the loading box 10, and the cover unit 30 may be folded maximally so that the upper portion of the loading box 10 is opened. In addition, the upper brackets 33 may allow the articulated rail 22 to be in a state of being maximally separated from the main rail 21.

While several embodiments of the present disclosure have been described with reference to the accompanying drawings, those of ordinary skill in the art should understand that the present disclosure may be carried out in various other specific forms without departing from the inventive concept of the present disclosure and without changing the technical spirit or an essential feature of the present disclosure. Therefore, it should be understood that the above-described embodiments are illustrative in all aspects and do not limit the present disclosure.

What is claimed is:

1. A loading box cover assembly for a vehicle, the assembly comprising:

a cover unit, which includes a plurality of slats, in which each slat of the plurality of slats has an upper end and a lower end alternately connected to adjacent slats in a folded condition, and which is configured to be selectively folded and unfolded to uncover or cover a loading box of the vehicle;

a main rail disposed at an upper end of the loading box of the vehicle, extending in a rearward direction of the vehicle, and configured to guide the lower ends of the plurality of slats; and an articulated rail installed on the main rail and configured to guide the upper ends of the plurality of slats, wherein, when the cover unit is folded, the articulated rail is separated from the main rail to guide the upper ends of the plurality of slats.

2. The assembly of claim 1, wherein the articulated rail includes:

a first rail member configured to maintain a linear shape when the articulated rail is separated from the main rail; and a second rail member configured to become a curved shape when the articulated rail is separated from the main rail.

3. The assembly of claim 2, wherein the first rail member includes:

a first body;

a first upper guide extending laterally inward from an upper end of the first body by a predetermined length;

a first lower guide extending laterally inward from a lower end of the first body by a predetermined length;

a first connection hole hinge-connected to another first rail member disposed to overlap the first rail member or the second rail member;

a first connection hook fitted into another first rail member disposed to overlap the first rail member or the second rail member; and a fastening hole into which the first connection hook or a second connection hook formed on the second rail member is fitted.

4. The assembly of claim 3, wherein an end portion of the first upper guide extends laterally inward beyond an end portion of the first lower guide.

5. The assembly of claim 3, wherein:

an upper bracket connects the upper ends of the two adjacent slats; and an upper slider is rotatably disposed on the upper bracket and configured to slide between the first upper guide and the first lower guide when the two adjacent slats are folded.

6. The assembly of claim 2, wherein the second rail member includes:

a second body;

a second upper guide extending laterally inward from an upper end of the second body by a predetermined length;

a second lower guide extending laterally inward from a lower end of the second body by a predetermined length;

a second connection hole hinge-connected to another second rail member disposed to overlap the second rail member or the first rail member;

a second connection hook fitted into another second rail member disposed to overlap the second rail member or the first rail member; and a slit into which the second connection hook or a first connection hook formed on the first rail member is fitted.

7. The assembly of claim 6, wherein the slit is formed in an arc shape, and wherein the slit is configured to permit rotation or the second rail member and the other second rail member disposed to overlap each other at predetermined angles.

8. The assembly of claim 7, wherein a center line of the slit is a portion of a virtual circle around the second connection hole.

9. The assembly of claim 6, wherein an end portion of the second upper guide extends laterally inward beyond an end portion of the second lower guide.

10. The assembly of claim 2, wherein:

a lower bracket connects the lower ends of the two adjacent slats of the plurality of slats; and a lower slider is rotatably installed on the lower bracket and configured to slide on the main rail when the cover unit is folded.

11. The assembly of claim 1, further comprising a return spring configured to elastically support the articulated rail to be in contact with the main rail.

12. The assembly of claim 11, wherein the return spring has a first end fixed to a rail member installed closest to a rear end of the vehicle and a second end fixed to one side of the main rail and elastically supported toward a rear of the vehicle and of the articulated rail.

13. The assembly of claim 1, further comprising a connector disposed between two adjacent slats of the plurality of slats and each hinge-connected to the connector.

14. The assembly of claim 13, wherein a weather strip is provided between the two adjacent slats of the plurality of slats and the connector.

15. The assembly of claim 1, further comprising:

a driving motor;

a driving gear configured to be rotated by the driving motor; and a cable engaged with the driving gear and configured to selectively push and pull an end portion of the cover unit according to rotation of the driving gear, wherein a rearmost slat of the plurality of slats of the cover unit positioned to be maximally spaced apart from the driving motor is pushed to unfold the cover unit or pulled to fold the cover unit.

16. The assembly of claim 15, wherein the cable has a spiral formed on an outer circumferential surface thereof or teeth formed in a longitudinal direction on the cable to be engaged with the driving gear.

17. The assembly of claim 15, wherein the cable includes a pair of cables provided and connected to both ends of the rearmost slat of the plurality of slats of the cover unit positioned to be maximally spaced apart from the driving motor.

18. The assembly of claim 15, further comprising a housing in which the driving motor and the driving gear are disposed, wherein the housing is fixed to the front end of the main rail, and wherein the housing includes a cable groove in which the cable is disposed.

19. A vehicle comprising:

a loading box having a predetermined size formed in a rear portion of the vehicle;

a loading box cover assembly configured to selectively cover and uncover the loading box, wherein the loading box cover assembly includes a cover unit, which includes a plurality of slats, in which each slat of the plurality of slats has an upper end and a lower end alternately connected to adjacent slats in a folded condition, and which is configured to be selectively folded and unfolded, a main rail disposed at an upper end of the loading box of the vehicle, extending in a rearward direction of the vehicle, and configured to guide the lower ends of the plurality of slats, and an articulated rail installed on the main rail and configured to guide the upper ends of the plurality of slats, wherein, when the cover unit is folded, the articulated rail is separated from the main rail to guide the upper ends of the plurality of slats; and a drive unit installed in a housing for selectively folding and unfolding the cover unit of the loading box cover assembly relative to the loading box.

20. The vehicle of claim 19, wherein the drive unit comprises:

a driving motor;

a driving gear configured to be rotated by the driving motor; and a cable engaged with the driving gear and configured to selectively push and pull an end portion of the cover unit according to rotation of the driving gear, wherein a rearmost slat of the plurality of slats of the cover unit positioned to be maximally spaced apart from the driving motor is pushed to unfold the cover unit and pulled to fold the cover unit.

* * * * *